US009146994B2

(12) United States Patent
Emanuel et al.

(10) Patent No.: US 9,146,994 B2
(45) Date of Patent: Sep. 29, 2015

(54) PIVOT FACETS FOR TEXT MINING AND SEARCH

(71) Applicant: International Business Machines Corporation, Armonk, NY (US)

(72) Inventors: Barton W. Emanuel, Manassas, VA (US); Todd Leyba, Potomac, MD (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 13/837,247

(22) Filed: Mar. 15, 2013

(65) Prior Publication Data

US 2014/0280284 A1    Sep. 18, 2014

(51) Int. Cl.
*G06F 17/30* (2006.01)
*G06F 17/00* (2006.01)

(52) U.S. Cl.
CPC .... *G06F 17/30864* (2013.01); *G06F 17/30011* (2013.01); *G06F 17/30651* (2013.01)

(58) Field of Classification Search
CPC ... G06Q 50/01; G06Q 40/08; G06Q 30/0631; G06Q 10/06316; G06Q 30/0201; G06Q 40/00; G06Q 10/00; G06Q 10/06; G06Q 10/063; G06Q 10/06398; G06Q 10/10; G06Q 10/063114; G06Q 10/101; G06Q 10/1053; G06Q 30/016; G06Q 30/02; G06Q 30/0203
USPC ............................................ 707/739; 706/45
See application file for complete search history.

(56) References Cited

U.S. PATENT DOCUMENTS

| 7,774,383 | B2 | 8/2010 | Acevedo-Aviles et al. |
| 2009/0234849 | A1 | 9/2009 | Erera et al. |
| 2011/0060734 | A1 | 3/2011 | Hou et al. |
| 2013/0024440 | A1* | 1/2013 | Dimassimo et al. .......... 707/709 |

OTHER PUBLICATIONS

US Patent Application, dated Sep. 24, 2014, for U.S. Appl. No. 14/495,121, filed Sep. 24, 2014, entitled "Pivot Facets for Text Mining and Search", invented by Barton W. Emanuel et al., Total 44 pages.
Preliminary Amendment, dated Sep. 24, 2014, for U.S. Appl. No. 14/495,121, filed Sep. 24, 2014, entitled "Pivot Facets for Text Mining and Search", invented by Barton W. Emanuel et al., Total 5 pages.
Anonymous; "System and Framework for Facilitating Faceted Interaction with Data from Different Data Sources", ip.com. Retrieved from the Internet at <URL: http://ip.com/IPCOM/000199917>, Sep. 21, 2010, Total 23 pages.
Brunetti, J.M., R. Gil, and R. Garcia, "Facets and Pivoting for Flexible and Usable Linked Data Exploration", Lleida University, Lleida, Spain, Workshop co-located with the 9th Extended Semantic Web Conference; May 28, 2012, 2012, Total 14 pages.

(Continued)

*Primary Examiner* — Yicun Wu
(74) *Attorney, Agent, or Firm* — Janaki K. Davda; Konrad, Raynes, Davda and Victor LLP

(57) ABSTRACT

Provided are techniques for providing and using pivot facets for text mining and search. A metadata field is mapped to a pivot facet. In response to executing a first query, at least a first document and the pivot facet are displayed. In response to selection of the pivot facet, a second query that includes a value of the metadata field is generated, and the second query is executed to locate at least a second document that includes the value of the metadata field.

12 Claims, 16 Drawing Sheets

(56) References Cited

OTHER PUBLICATIONS

Korkontzelos, I, T. Mu, and S. Ananiadou, "ASCOT: A Text Mining-based Web-service for Efficient Search and Assisted Creation of Clinical Trials", BMC Medical Informatics and Decision Making, 2012, ACM Fifth International Workshop on Data and Text Mining in Biomedical Informatics (DTMBio, 2011), Glasgow UK, Oct. 24, 2011, Total 12 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Srivastava, D. and Y. Velegrakis, "MMS: Using Queries As Data Values for Metadata Management", AT&T Labs-Research, ICDE, 2007, Total 2 pp.

Wang, J. and C. Chen, "An Automated Tool for Managing Interactions in Virtual Communities—Using Social Network Analysis Approach", Journal of Organizational Computing and Electronic Commerce; vol. 14, No. 1, pp. 1-26, 2004. [Also Total 15 pp.].

Office Action, dated Apr. 10, 2015, for U.S. Appl. No. 14/495,121, filed Sep. 24, 2014, invented by B.W. Emanuel et al., Total 14 pages.

Response to Office Action, dated May 4, 2015, for U.S. Appl. No. 14/495,121, filed Sep. 24, 2014, invented by B.W. Emanuel et al., Total 7 pages.

Notice of Allowance, Jun. 5, 2015, for U.S. Appl. No. 14/495,121, filed on Sep. 24, 2014 by B.W. Emanuel et al., Total 11 pages. [54.104C1 (NOA)].

\* cited by examiner

| Index field name | Input sources | Facets | Returnable | Faceted search | Free text serch | In summary | Fielded search |
|---|---|---|---|---|---|---|---|
| reportdate | XML element: ReportDate ✎✗ ○ | | ▣ | ☐ | ▣ | ☐ | ▣ |
| reportsourcecode | XML element: ReportSourceCode ✎✗ ○ | | ▣ | ☐ | ▣ | ☐ | ▣ |
| reporttofda | XML element: ReportToFDA ✎✗ ○ | | ▣ | ☐ | ▣ | ☐ | ▣ |
| reporttomanufacturer | XML element: ReportToManufacturer ✎✗ ○ | Report To Manufacturer | ▣ | ▣ | ▣ | ☐ | ▣ |

Columns to import:

| | Import Column | Index field name | Returnable | Faceted search | Free text search | In summary | Fie se |
|---|---|---|---|---|---|---|---|
| ☑ | All | | | | | | |
| ☑ | Doctor ID | doctorid ▼ | ☑ | ☐ | ☐ | ☐ | |
| ☑ | Patient ID | patientid ▼ | ☑ | ☐ | ☐ | ☐ | |
| ☑ | Doctor Visit Date | doctorvisitdate ▼ | ☑ | ☐ | ☐ | ☐ | |
| ☑ | Doctor Visit Abstract | doctorvisitabstract ▼ | ☑ | ☐ | ☑ | ☑ | |
| ☑ | Rec Type | rectype ▼ | | ☐ | ☐ | ☐ | |

— 1010

Import options
*Import Space ID:
This ID is used to distinguish imported documents from other documents in the index. Ensure that the ID
9.76.195.140/DoctorVisitTable.csv
▶ Advanced options Preview:

| | Doctor ID | Patient ID | Doctor Visit Date | Doctor Visit Abstract | Rec Type |
|---|---|---|---|---|---|
| 1: | | | | | |
| 2: | D1 | P1 | 2012-04-15 | Patient was complaining | DoctorVisit |
| 3: | D2 | P2 | 2012-04-15 | Laceration | DoctorVisit |
| 4: | D3 | P2 | 2012-05-17 | Overdose | DoctorVisit |
| 5: | D4 | P3 | 2012-05-21 | Broken leg | DoctorVisit |

— 1000

| Source | Date | Title |
|---|---|---|
| CSV file<br>Large mass located in lower left lung<br><br>Document ID: csv://9.65.2.90%2FRadiologyVisitTable.csv?id=0<br>Title: RadiologyVisitTable.csv?id=0<br>Language: en<br>Source: csv<br><br>patientid: P1<br>radiologyreport: Large mass located in lower left lung<br>radiologyvisitdate: 2012-04-15<br>rectype: Radiology<br>radiologyid: R1<br>date: 12/31/69 | 12/31/69 | RadiologyVisitTable.csv?id=0 |
| CSV file<br><br>Document ID: csv://9.65.2.90%2FPatientTable.csv?id=0<br>Title: PatientTable.csv?id=0<br>Language: en<br>Source: csv<br><br>patientid: P1<br>patientcity: Smallville<br>patientgender: M<br>patientname: John Smith<br>rectype: Patient<br>doctorid: D1<br>patientage: 32 | 12/31/69 | PatientTable.csv?id=0 |

1200 — (first row)
1210 — (second row)

| Documents | Facets | Time Series | Deviations | Trends | Facet Pairs | Connections | Dashboard | Related Docs |

Results 1-1 of 1
(1/15 results matched)

Results per page

Facet Navigation  Default order ▼

Filter: [____] Clear

▶ Part of Speech?
▶ Phrase Constituent?
▲ Noun Phrase
▶ Predicate Phrase
   Predicate with Adverb
   Noun – Predicate
   Verb – Noun
▲ Conjunction Phrase ▶ Contextual Views
Contextual views to show:
☑ DoctorDiagnosis
☐ RadiologyReport
Display mode for document summaries:

| Source | Date | Title |
| --- | --- | --- |
| CSV file | 12/31/69 | DoctorVisitTable.csv?id=2 | patientid: P2
rectype: DoctorVisit
doctorid: D3
doctorvisitdate: 2012-05-17
date: 12/31/69
doctorvisitabstract: Overdose on sleeping pills and pain medication Show related documents...

DoctorTable.csv?id=2
rectype: Doctor
☐ doctorid: D3
☐ doctorname: Dr. Bailey
☐ doctorprofession: Pediatrician
☐ date: 12/31/69

PatientTable.csv?id=1
☐ patientid: P2
☐ patientcity: Seaton
☐ patientgender: F
  patientname: Sue Jones
  rectype: Patient
☐ doctorid: D2

Clicking here results in the following query for key fields: (patientid:P2 OR doctorid:D3) -rectype:DoctorVisit to produce the following results

FIG. 13

PIVOT FACETS FOR TEXT MINING AND SEARCH

FIELD

Embodiments of the invention relate to pivot facets for text mining and search.

BACKGROUND

Search and text analytics systems traditionally work on "flattened" data and information in which linked data is collated at the document level. A search system typically receives a query and executes the query to identify search results, such as documents. The search results resolve to the document level, and facets (dimensions) may be used to navigate or drill-down to select narrower results from current available search results as constrained by the query in effect and other selection criteria.

A text analytics system typically analyzes text in documents to generate information for analysis (e.g., with lexical analysis to study word frequency distributions, pattern recognition, tagging/annotation identification, information extraction, etc.). Text analytics may also be referred to as data mining and may include performing link and association analysis and drill down.

Sometimes, relational data is also included in a search or text mining collection, but the relationships between information may be flattened (lost) in order to conform to a simple document model. If a user wants to use such relationship information stored in a search engine's flattened documents, and drill down into linked information, a user may look at the metadata of a document in the search results, select a field containing a key into the "relational" data, clear the current query and search criteria, and issue a new query using the key in order to view the related data in the search results or to navigate to individual related data documents.

SUMMARY

Provided is a method for providing and using pivot facets for text mining and search. A metadata field is mapped, using a processor of a computer, to a pivot facet. In response to executing a first query, at least a first document and the pivot facet are displayed using the processor of the computer. In response to selection of the pivot facet, a second query that includes a value of the metadata field is generated using the processor of the computer, and the second query is executed, using the processor of the computer, to locate at least a second document that includes the value of the metadata field.

Provided is a computer program product for providing and using pivot facets for text mining and search. The computer program product comprises a computer readable storage medium having program code embodied therewith, the program code executable by at least one processor to: map, by the at least one processor, a metadata field to a pivot facet; in response to executing a first query, display, by the at least one processor, at least a first document and the pivot facet; and, in response to selection of the pivot facet, generate, by the at least one processor, a second query that includes a value of the metadata field, and execute, by the at least one processor, the second query to locate at least a second document that includes the value of the metadata field.

Provided is a computer system for providing and using pivot facets for text mining and search. The computer system comprises one or more processors, one or more computer-readable memories and one or more computer-readable, tangible storage devices, and program instructions, stored on at least one of the one or more computer-readable, tangible storage devices for execution by at least one of the one or more processors via at least one of the one or more memories, to: map a metadata field to a pivot facet; in response to executing a first query, display at least a first document and the pivot facet; and, in response to selection of the pivot facet, generate a second query that includes a value of the metadata field, and execute the second query to locate at least a second document that includes the value of the metadata field.

BRIEF DESCRIPTION OF THE SEVERAL VIEWS OF THE DRAWINGS

Referring now to the drawings in which like reference numbers represent corresponding parts throughout:

FIG. 9 illustrates an example index in accordance with certain embodiments.

FIG. 10 illustrates information used to import a doctor visit table to a document instance in accordance with certain embodiments.

FIG. 12 illustrates two different record types in accordance with certain embodiments.

FIG. 13 illustrates search results with pivot facets in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
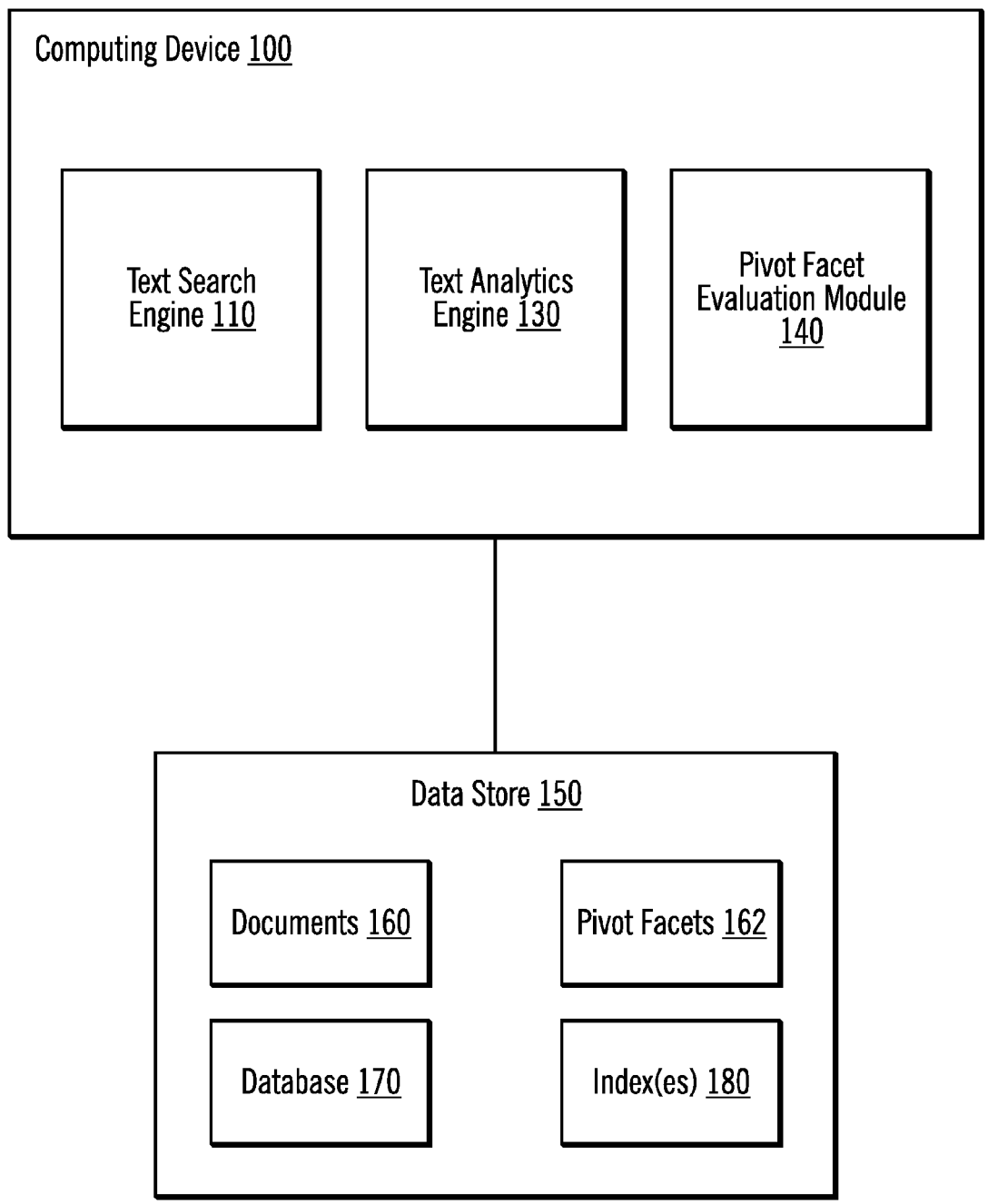
FIG. 1 illustrates a computing environment in accordance with certain embodiments.

FIG. 1 illustrates a computing environment in accordance with certain embodiments. A computing device 100 includes a text search engine 110, a pivot facet evaluation module 140, and a text analytics engine 130. The computing device 100 is coupled to a data store 150. The data store 150 includes documents 160, pivot facets 162, a database 170, and one or more indexes 180.

In certain embodiments, the text search engine 110 and pivot facet evaluation module 162 provide for efficient search capabilities through textual documents. In addition to the raw text contained in the documents, the text search engine 110 also accommodates for the ingest of and searching through of metadata (fields) associated with documents (e.g., author, date created, title, etc.) The pivot facet evaluation module 162 provides related documents when a pivot facet is selected.

Figure 2:
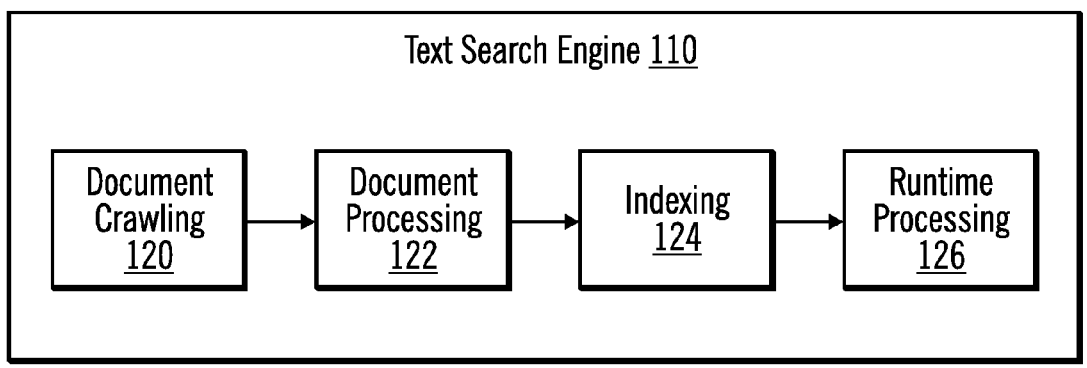
FIG. 2 illustrates details of a text search engine in accordance with certain embodiments.

FIG. 2 illustrates details of the text search engine 110 in accordance with certain embodiments. The text search engine 110 performs document crawling 120, document processing 122, indexing 124, and runtime processing 126. Document crawling 120 includes crawling one or more data sources for content and metadata while providing native Access Control List (ACL) support. Document processing 122 includes extracting text from the documents identified by document crawling 120, identifying the language of the documents, and applying an array of text analytics (e.g., using the text analytics engine 130) to identify and extract various features in the text. Indexing 124 receives the processed documents and generates the one or more indexes 180 for the processed documents. Runtime processing 126 includes advanced search and facet support.

A facet may be described as a dimension, attribute or metadata on which a search may be made to limit search results (e.g., one or more documents). A pivot facet may be described as a dimension, attribute or metadata field that contains a key value linking a specific document to other documents in the corpus that contain the same keyed value. In certain embodiments, the use of pivot facets provides clickable links to related documents for a specific search result.

The pivot facet may be selected, and, in response to the selection, the pivot facet evaluation module 140 clears the current query and selection criteria, and resubmits (to the text search engine 110) a new query containing the key needed to select related documents. The text search engine 110 executes the new query and displays the related documents in the search results. In certain embodiments, the pivot facet evaluation module 140 may clear the current query and add additional criteria to the search criteria.

Figure 3:
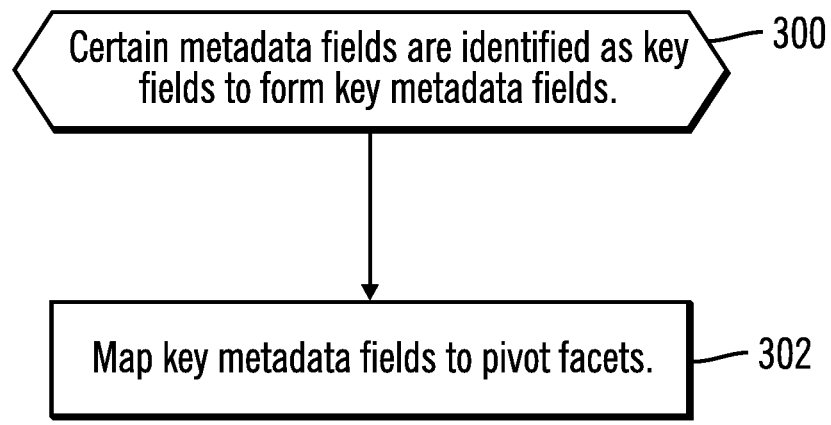
FIG. 3 illustrates, in a flow diagram, operations performed to create pivot facets in accordance with certain embodiments.

FIG. 3 illustrates, in a flow diagram, operations performed to create pivot facets in accordance with certain embodiments. Control begins at block 300 with certain metadata fields being identified as key fields to form key metadata fields. Unique identifiers for the key metadata fields may be used to identify sets of documents. In certain embodiments, determining which metadata is a "key" field (and potentially mapped to a pivot facet) is either indicated by the crawled source repository, or, if not available, indicated by the administrator of the text search engine 110. For example, if to model a parent-child relationship with multiple children possible for the parent, the parent document may contain a metadata field called "children", and the child documents may contain a metadata field called "parent." The child documents have a unique identifier in the "parent" field resolving to the parent's "children" field. In certain embodiments, this is similar to native keys/foreign keys in relational databases.

In block 302, the pivot facet evaluation module 140 maps the key metadata fields to pivot facets.

Thus, the pivot facet evaluation module 140 captures relationships between documents as metadata fields with identifiers to identify sets of related documents.

Figure 4:
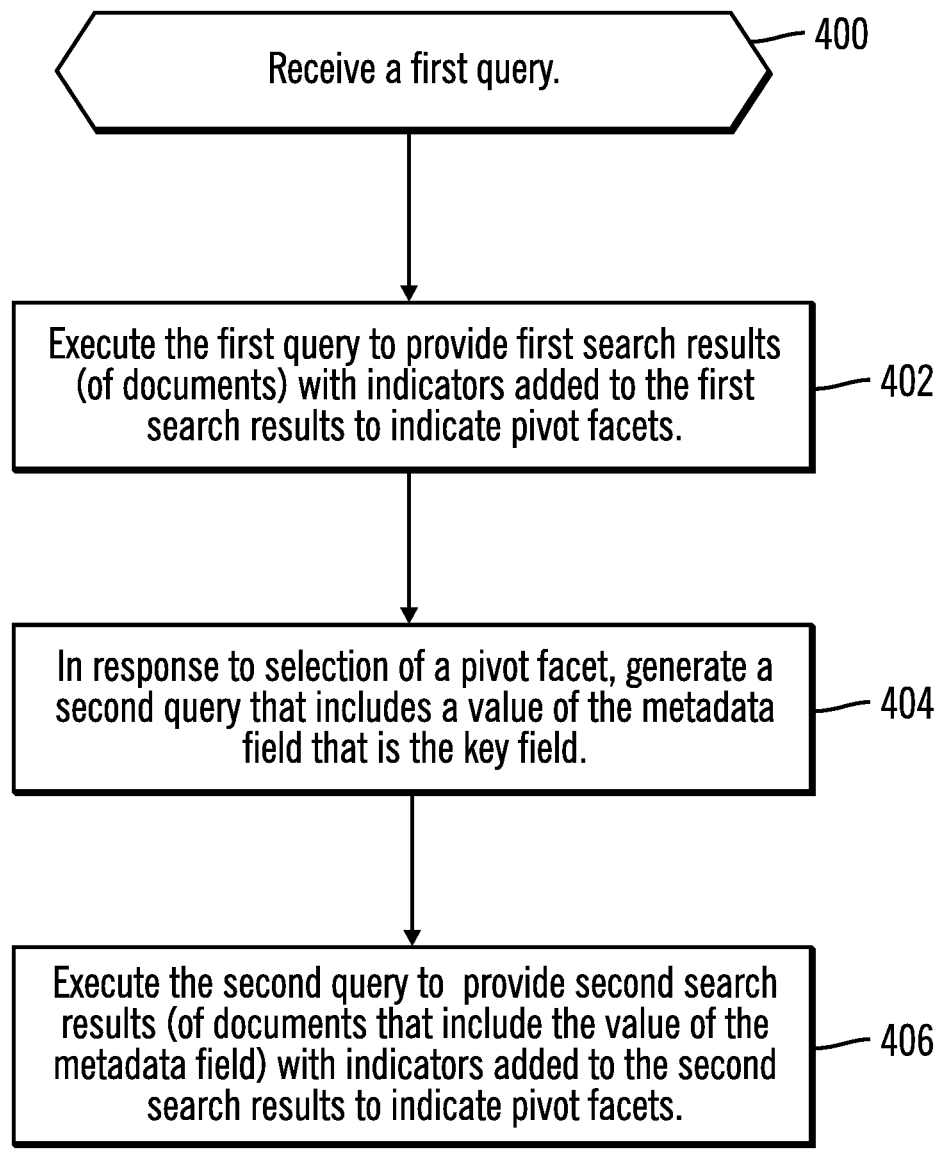
FIG. 4 illustrates, in a flow diagram, operations performed to use pivot facets in accordance with certain embodiments.

FIG. 4 illustrates, in a flow diagram, operations performed to use pivot facets in accordance with certain embodiments. Control begins with the text search engine 110 receiving a first query. In block 402, the text search engine 110 executes the first query (against a first corpus of documents, such as a collection) to provide first search results (of documents) with indicators added to the first search results to indicate pivot facets. In certain embodiments, the search results are provided by displaying the search results on a computer screen. In other embodiments, the search results are provided in a report. In certain embodiments, the indicators may be added by displaying the metadata fields that are mapped to pivot facets in a different format than metadata fields that do not map to pivot facets. Regular facets contain values that are not keys and, hence, cannot be used to link to other documents in the corpus. For example, the metadata fields that are mapped to pivot facets may be shown in bold or in a different color or font type. In certain embodiments, the indicators may be specified as a "Show Related Docs" link.

In block 404, in response to selection of a pivot facet, pivot facet evaluation module 140 generates a second query that includes a value of the metadata field that is the key field. In certain embodiments, the pivot facet evaluation module 140 may substitute terms in the query with other terms or fields with other fields. In block 406, the text search engine 110 receives and executes the second query (against the same or a different collection of documents) to provide second search results (of documents that include the value of the metadata field) with indicators added to the second search results to indicate pivot facets.

For example, when a "children" pivot facet is selected, the pivot facet evaluation module 140 generates a query to return each document in which the value of a "parent" field in the current search results is contained in a "children" field. As another example, when a "parent" pivot facet is selected, the pivot facet evaluation module 140 generates a query to return each document in which the value of a "children" filed of documents is contained in the "parent" field.

Thus, in certain embodiments, a user conducts searches and arrives at search results using traditional search and navigation methods, including faceted search. In addition, pivot facets are mapped to key metadata fields and are shown in the search results For example, if documents in the search results contained a "children" field, the corresponding "children" pivot facet is displayed, and, when the user clicks on the children pivot facet, the pivot facet evaluation module 140 clears the current search criteria (so that the entire corpus is searched) and generates a new query to find documents where the parent field contains any of the values contained in the children field of the set of documents from the current search results. The text search engine 110 executes the new query and provides new search results to the user.

Figure 5:
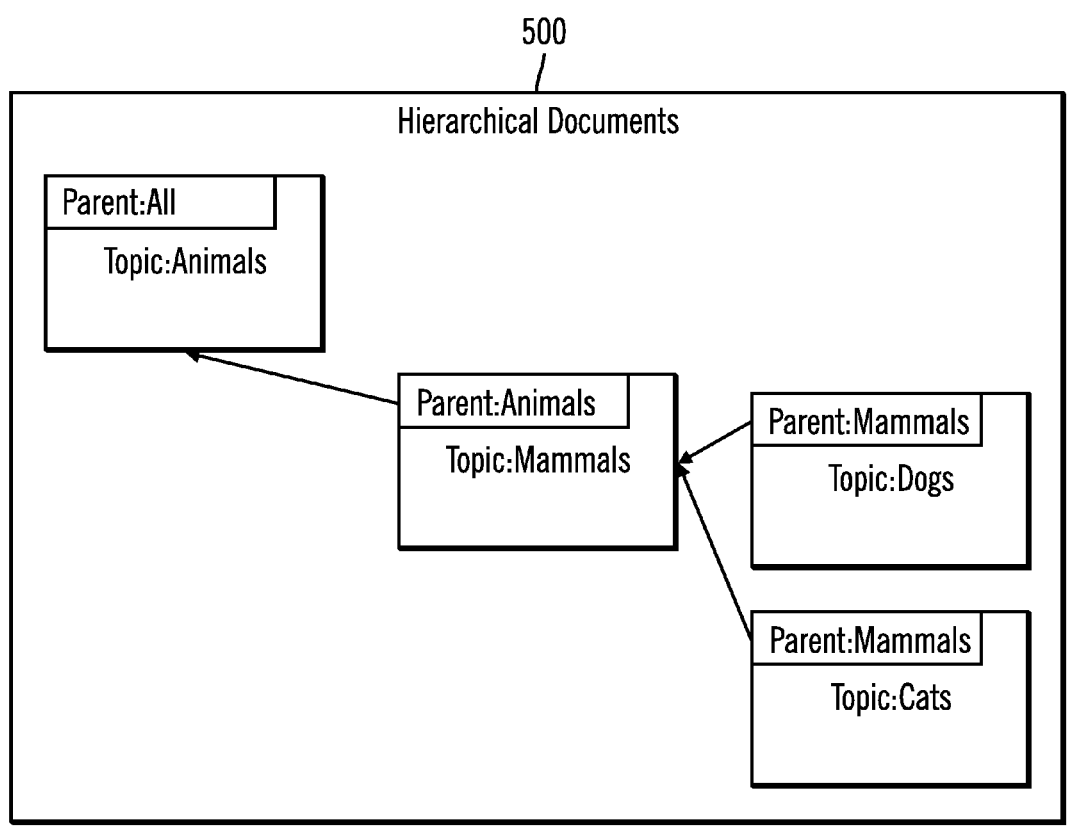
FIG. 5 illustrates hierarchical documents in accordance with certain embodiments.

FIG. 5 illustrates hierarchical documents 500 in accordance with certain embodiments. In this example, the hierarchical documents include documents for different topics (animals, mammals, dogs, cats). Each document has a metadata field for "parent", which points to the parent document.

Figure 6:
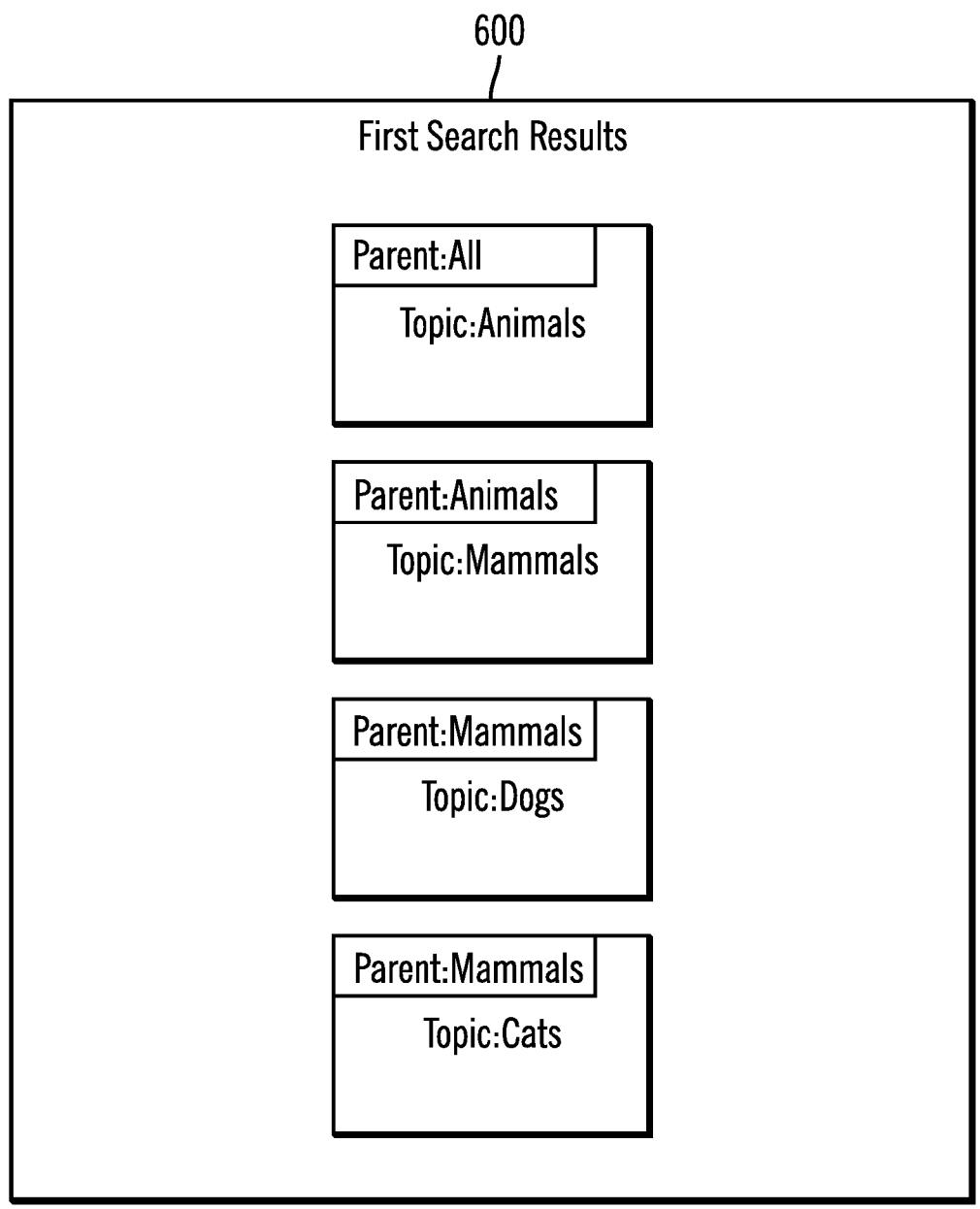
FIG. 6 illustrates search results with pivot facets for hierarchical documents in accordance with certain embodiments.

FIG. 6 illustrates search results 600 with pivot facets for hierarchical documents in accordance with certain embodiments. In certain embodiments, the pivot facet is a keyed value that may be in other documents. Thus, the pivot facet may be used to discover hierarchical relationships. For example, the dogs and cats documents may contain a metadata field called "animal-type", whose value may be set to "mammal". If this metadata field is identified as a key field and subsequently mapped to a pivot facet, then, when "mammal" is selected, the text search engine 110 issues a search for other documents whose key fields contain the value "mammal". Note that the search excludes the current cats and dogs class of documents (rectypes) so that the text search engine 110 does not return the current cat or dog document again. So, by clicking on the "animal-type" pivot facet, the user is getting back the parent document whose value is mammal.

Thus, if a user wants the mammals document, instead of searching for other documents where the parent metadata field contains the value "mammals", selection of the pivot facet would trigger a search for other documents where the topic field contains the "mammals" value). That is, the pivot facet evaluation module 140 changes the query by searching on topic instead of parent.

In certain embodiments, during query reformulation for a pivot facet, the query may be directed at a separate collection of documents (as opposed to the same collection that the search result currently belongs to). Collections may be described as logical groupings of documents as defined by the text search engine 110. Collections may be a physical index or may not.

Figure 7:
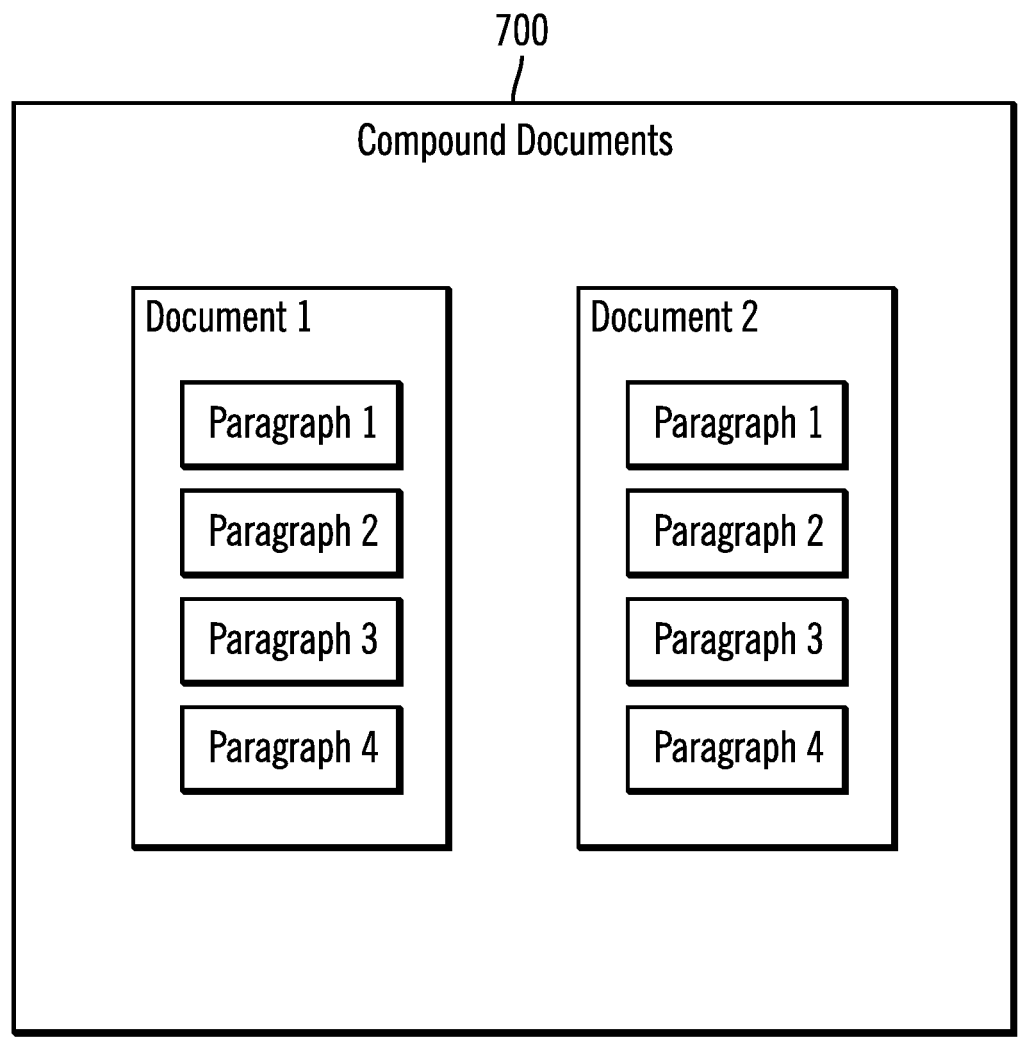
FIG. 7 illustrates compound documents in accordance with certain embodiments.

FIG. 7 illustrates compound documents 700 in accordance with certain embodiments. In this example, each document has several paragraphs. Embodiments may build a collection of the larger documents.

Figure 8:
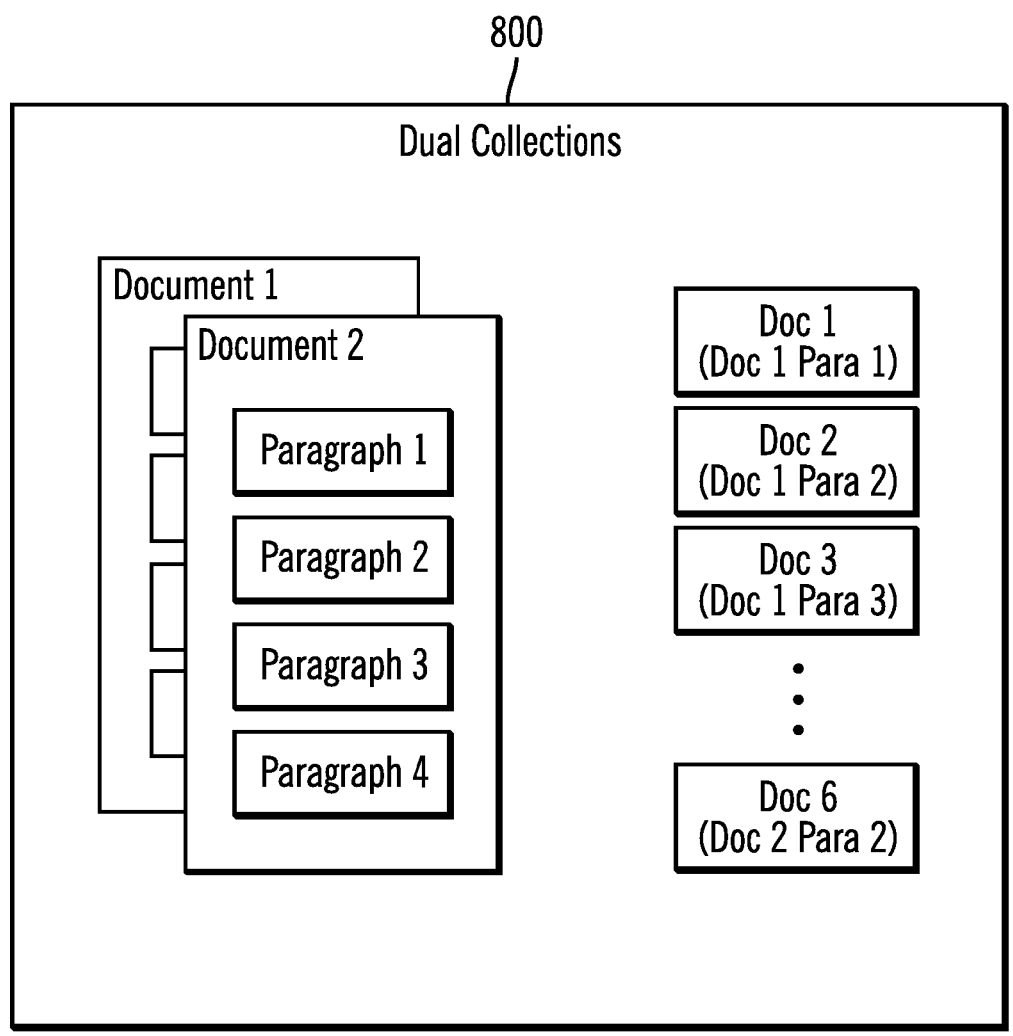
FIG. 8 illustrates dual collections in accordance with certain embodiments.

FIG. 8 illustrates dual collections 800 in accordance with certain embodiments. The dual collections 800 include: Collection 1, which is the original document, and Collection 2, which is the same collection indexed at the paragraph level. That is, each document in Collection 2 is a paragraph from one of the documents in Collection 1. In Collection 1, there is a metadata field called paragraphs, and the values contain the document identifier ("doc id") and paragraph numbers for each document's paragraphs. The pivot facet evaluation module 140 creates a pivot facet from this paragraph metadata field, which searches Collection 2 to retrieve the paragraphs for the document, and changes the search results display to show Collection 2 rather than Collection 1.

In certain embodiments, additional actions are associated with pivot facets. For example, if search results are received from a first document collection, then, a user selects a pivot facet for the search results and changes to a second document collection, so that the pivot facet evaluation module 140 generates a new query based on the pivot facet and executes the new query against the second document collection.

As another example, a user may select a pivot facet and change to another context, so that the pivot facet evaluation module 140 generates a new query based on the pivot facet and executes the new query in the new context. A context may be described as a virtual collection of documents (e.g., a collection of paragraphs within a collection of documents or as a specific field or set of fields common to a subset of documents in a collection).

As a further example, a user may select a pivot facet and select a new (e.g., a different, existing) field. For this example, the pivot facet evaluation module 140 generates a new query by substituting the new field for the current field being searched.

Pivot facets are used to trigger reformulation of the query, as well as, to perform other actions that will allow bringing more information to the end user (such as related documents) without having the user perform additional processing.

In this example, a collection contains hierarchical documents, with each hierarchical document having a metadata field named "parent" and a metadata field named "children". The pivot facet evaluation module 140 is able to configure a pivot facet to navigate up or down the document hierarchy by changing the query to look for the doc ids in the parent field, or to look for selected document docids in the children fields of documents.

In certain embodiments, selection of a pivot facet dynamically (1) changes an original query for execution against the same document collection, (2) executes the same query against a different document collection or different context, (3) executes a new query against the same document collection, or (4) executes the new query against a different document collection or different context. Thus, the pivot facet is "programmable" where a new query is auto-generated from metadata or content.

FIGS. 9-13 provide an example of a relational approach with collection documents for a healthcare scenario in accordance with certain embodiments.

With a relational approach, multiple record types ("rectypes") are created in the document collection that reflect the relational tables and preserve the entities/relationships through identified key fields. Each relational table in the relational database 170 represents a record type in the document collection. Each relational table may be crawled by a different crawler instance. Each crawled document represents a document instance (or row) of a record type. Fields specific to that relational table are mapped to index fields (which are examples of metadata fields). Also, relevant table columns in a user's Relational Database Management System (RDBMS) have corresponding index fields defined.

In certain embodiments, with the relational approach, the text search engine 110 displays search results with a "Show Related Docs" link and with relationships of facet values.

FIG. 9 illustrates an example index 900 in accordance with certain embodiments. In FIG. 9, the index 900 defines collection index fields for relational columns in the user's RDBMS. Also, a new index field attribute is added that indicates whether the index field is a "key field" or not. Moreover, an index field named "rectype" (record type) is created. In certain embodiments, the index field "rectype" is automatically created by default.

As another example, for an index for a healthcare scenario, the following index fields may be created: Patient ID (key), Patient Name, Patient Age, Patient Gender Doctor ID (key), Doctor Name, Doctor Profession, Doctor Visit Date (key), Doctor Notes, Radiology ID (key), Radiology Date (key), Radiology Report, etc.

FIG. 10 illustrates information used to import a doctor visit table to a document instance in accordance with certain embodiments. The "rectype" index field 1010 may be preset by the crawler so as to identify this type of record (document).

Figure 11:
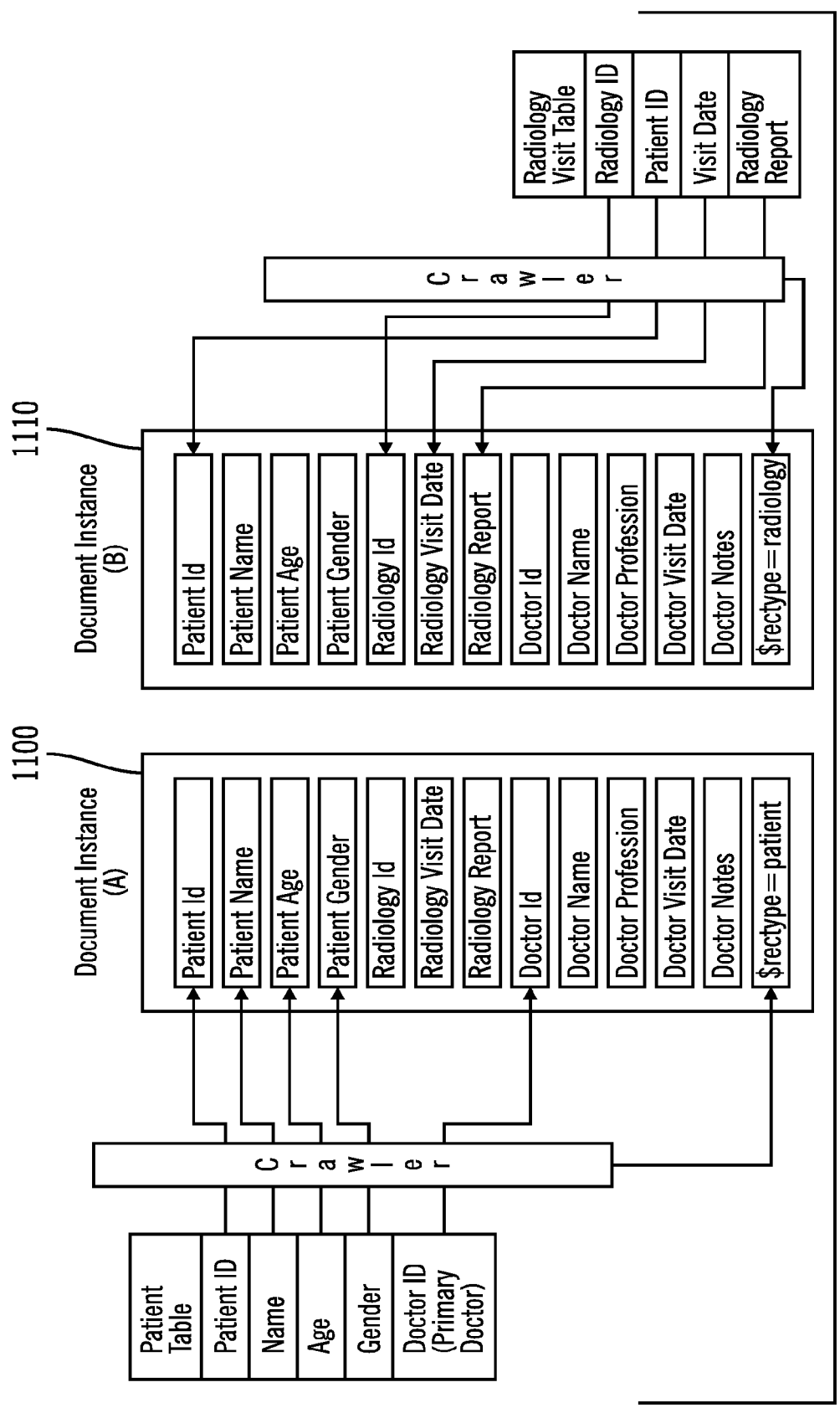
FIG. 11 illustrates creation of document instances in accordance with certain embodiments.

FIG. 11 illustrates creation of document instances in accordance with certain embodiments. In FIG. 11, fields of a document instance 1100 are filled in by crawling the patient table, and fields of a document instance 1110 are filled in by crawling a radiology visit table.

FIG. 12 illustrates two different record types 1200, 1210 in accordance with certain embodiments. The text search engine 110 may provide different formatting for different record types in the search results.

Because record types and their identified key fields are available, the pivot facet evaluation module 140 may issue additional queries to retrieve linked documents. In addition, other non-key fields (e.g., DoctorVisitDate) may be used to further filter the search results.

For a given record type instance (e.g., from a set of search results), the pivot facet evaluation module 140 may issue a search for related documents by searching for contained key values that appear in other record types. The following are examples of search requirements and a possible search query:

Show all doctor visits for patient P1
Query (rectype:doctorVisits patientid:P1)
Show all patients for doctor D2
Query (rectype:patient doctorid:D2)
Given a doctorVisit Record for patient P1 and Doctor D2, show the record details of each
Query ((patientid:P1 rectype:patient) OR (doctorid:D2 rectype:doctor))—rectype:doctorVisits
In some cases, multiple queries may be issued:
Show all radiology visits that were prescribed by doctor D1
Query 1 (rectype:doctorVisits doctorid:D1)
For each unique patientId in each doctor visit record, Query 2 is issued Query 2 (rectype:radiologVisits (patientid:P1 or patientid:P2 or patientid:P3 . . . ))
Then, the text search engine 110 may display the search results of the multiple queries.

FIG. 13 illustrates search results 1300 with pivot facets in accordance with certain embodiments. The text search engine 110 displays the "Show Related Docs" indicator, and, in response to this indicator begin selected by a user, the text search engine 110 generates a new query, executes the new query, and displays related documents. Also, if a field is also a facet, the text search engine 110 provides a check box to allow further drill down on the specific field/facet value added to the current search query. In FIG. 13, the doctor visit record that contains the text to be analyzed can now be expanded to show the details about the related patient and the doctors involved. The doctor visit record contains two key fields that may be used to form the query ((patientid:P2 OR doctorid:D3)—rectype:DoctorVisit). This is enabled by adding a new attribute to the index fields to identify the key fields.

Thus, the text search engine 110:
adds a "rectype" index field to that is populated by each crawler and used to differentiate search results
adds a "key field" attribute to index fields to indicate which index fields may be used as keys for searching
optionally expands contextual views to include adding a record type to a context view to limit what other fields are to be included to limit scope of a document collection
adds a "Show Related Docs" link to search results and, for the chosen search results, issues a search for all occurrences of any present key fields in the search result and excludes a current rectype
provides a new view that takes advantage of linkages between documents, may provide a search box that allows the user to express relational kinds of searches (e.g., joins and intersections), and depending on complexity of the search expression, multiple searches may be issued Cloud Computing It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 14:
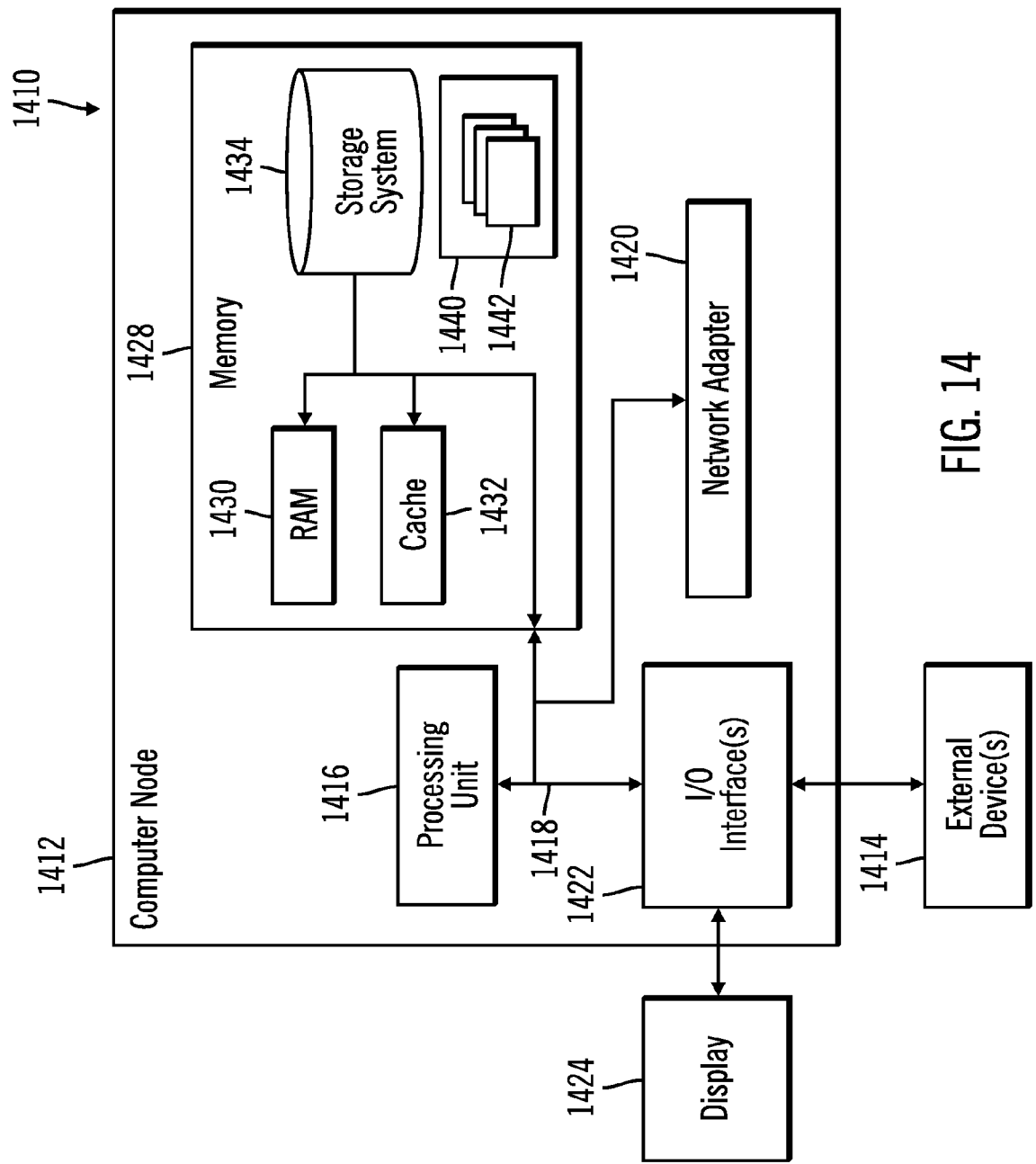
FIG. 14 illustrates a cloud computing node in accordance with certain embodiments.

Referring now to FIG. 14, a schematic of an example of a cloud computing node is shown. Cloud computing node 1410 is only one example of a suitable cloud computing node and is not intended to suggest any limitation as to the scope of use or functionality of embodiments of the invention described herein. Regardless, cloud computing node 1410 is capable of being implemented and/or performing any of the functionality set forth hereinabove.

In cloud computing node 1410 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 1412 in cloud computing node 1410 is shown in the form of a general-purpose computing device. The components of computer system/server 1412 may include, but are not limited to, one or more processors or processing units 1416, a system memory 1428, and a bus 1418 that couples various system components including system memory 1428 to a processor or processing unit 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 15:
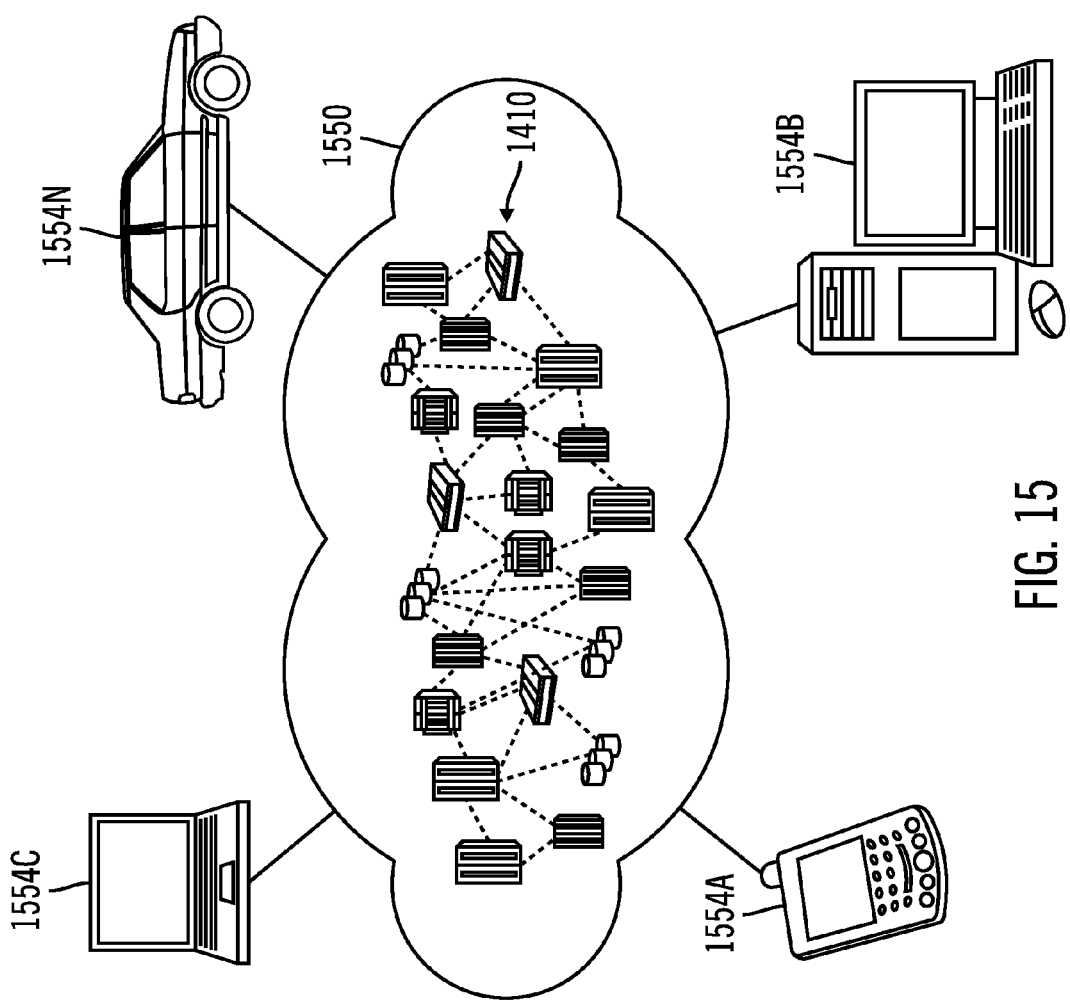
FIG. 15 illustrates a cloud computing environment in accordance with certain embodiments.

Referring now to FIG. 15, illustrative cloud computing environment 1550 is depicted. As shown, cloud computing environment 1550 comprises one or more cloud computing nodes 1410 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 15 are intended to be illustrative only and that computing nodes 1410 and cloud computing environment 1550 can communicate with any type of computerized device over any type of network and/or network addressable connection (e.g., using a web browser).

Figure 16:
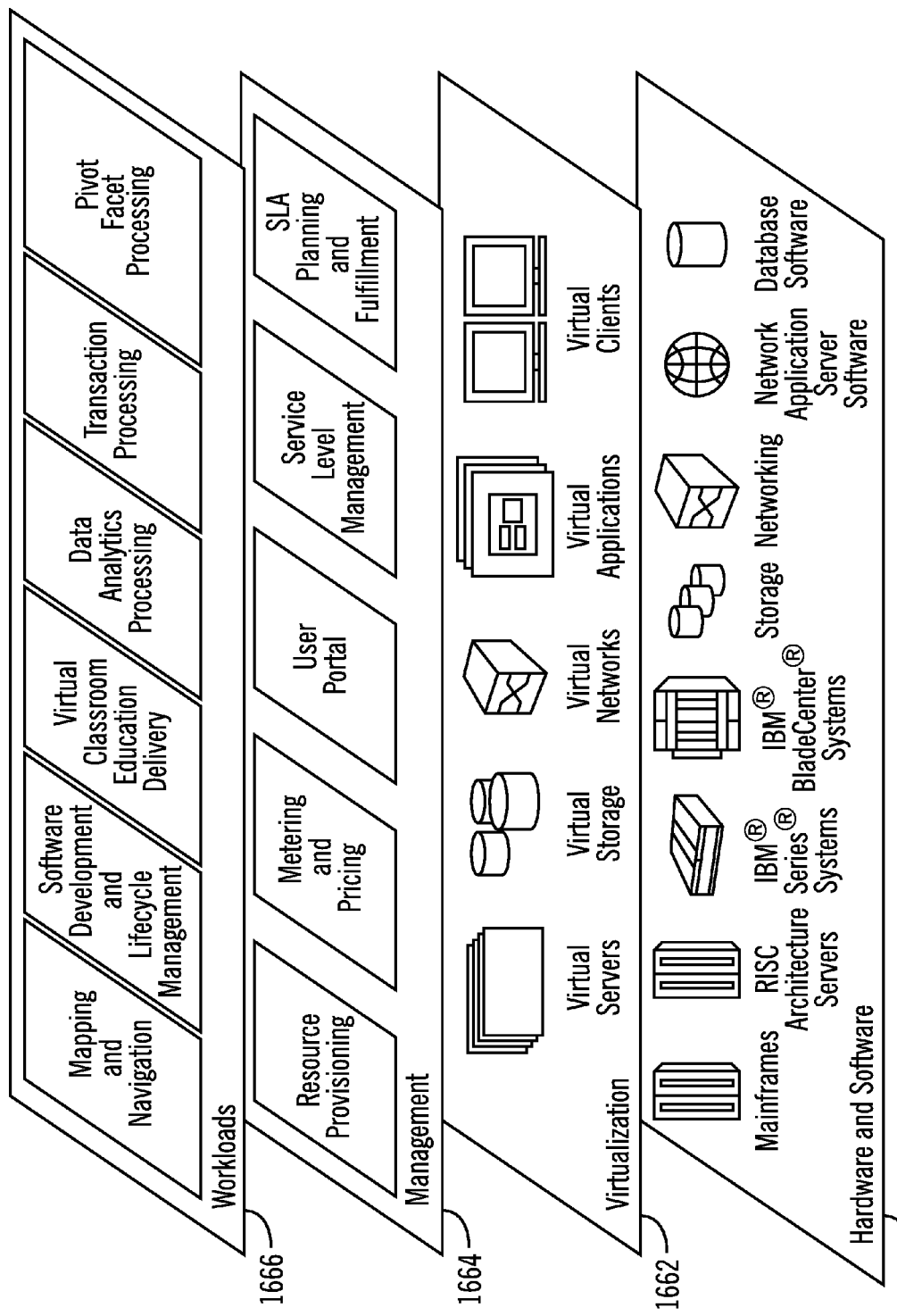
FIG. 16 illustrates abstraction model layers in accordance with certain embodiments.

Referring now to FIG. 16, a set of functional abstraction layers provided by cloud computing environment 1550 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and pivot facet processing.

Thus, in certain embodiments, software or a program, implementing pivot facet processing in accordance with embodiments described herein, is provided as a service in a cloud environment.

In certain embodiments, the computing device 100 has the architecture of computing node 1410. In certain embodiments, the computing device 100 is part of a cloud environment. In certain alternative embodiments, the computing device 100 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (i.e., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A computer program product, the computer program product comprising a computer readable storage medium having program code embodied therewith, the program code executable by at least one processor to:
   associate, by the at least one processor, a metadata field with one or more documents in a first document collection and in a second document collection to link the documents based on a relationship defined by the metadata field;
   in response to executing a first query, display, by the at least one processor, at least a first document in the first document collection and a pivot facet that is used to trigger a new search for documents related to the first document based on the metadata field; and
   in response to selection of the pivot facet and the second document collection,
      generate, by the at least one processor, a second query that includes a value of the metadata field; and
      execute, by the at least one processor, the second query against the second document collection to locate at least a second document that includes the value of the metadata field.

2. The computer program product of claim 1, wherein the metadata field is a key field.

3. The computer program product of claim 1, wherein the program code is executable by at least one processor to:
   receive, by the at least one processor, selection of a new context; and
   execute, by the at least one processor, the second query against the new context.

4. The computer program product of claim 1, wherein the program code is executable by at least one processor to:
   receive, by the at least one processor, selection of a new metadata field;
   generate, by the at least one processor, a third query that includes a value of the new metadata field; and
   execute, by the at least one processor, the third query.

5. The computer program product of claim 1, wherein the program code is executable by at least one processor to:
   map, by the at least one processor, the metadata field to the pivot facet.

6. The computer program product of claim 1, wherein a Software as a Service (SaaS) is configured to perform the computer program product operations.

7. A computer system, comprising:
   one or more processors, one or more computer-readable memories and one or more computer-readable, tangible storage devices; and
   program instructions, stored on at least one of the one or more computer-readable, tangible storage devices for execution by at least one of the one or more processors via at least one of the one or more memories, to:
   associate a metadata field with one or more documents in a first document collection and in a second document collection to link the documents based on a relationship defined by the metadata field;
   in response to executing a first query, display at least a first document in the first document collection and a pivot facet that is used to trigger a new search for documents related to the first document based on the metadata field; and
   in response to selection of the pivot facet and the second document collection,
      generate a second query that includes a value of the metadata field; and
      execute the second query against the second document collection to locate at least a second document that includes the value of the metadata field.

8. The computer system of claim 7, wherein the metadata field is a key field.

9. The computer system of claim 7, wherein the program instructions are stored on at least one of the one or more computer-readable, tangible storage devices for execution by at least one of the one or more processors via at least one of the one or more memories to:
   receive selection of a new context; and
   execute the second query against the new context.

10. The computer system of claim 7, wherein the program instructions are stored on at least one of the one or more computer-readable, tangible storage devices for execution by at least one of the one or more processors via at least one of the one or more memories to:
   receive selection of a new metadata field;
   generate a third query that includes a value of the new metadata field; and
   execute the third query.

11. The computer system of claim 7, wherein the program instructions are stored on at least one of the one or more computer-readable, tangible storage devices for execution by at least one of the one or more processors via at least one of the one or more memories to:
   map the metadata field to the pivot facet.

12. The computer system of claim 7, wherein a Software as a Service (SaaS) is provided to perform the system operations.

* * * * *